UNITED STATES PATENT OFFICE.

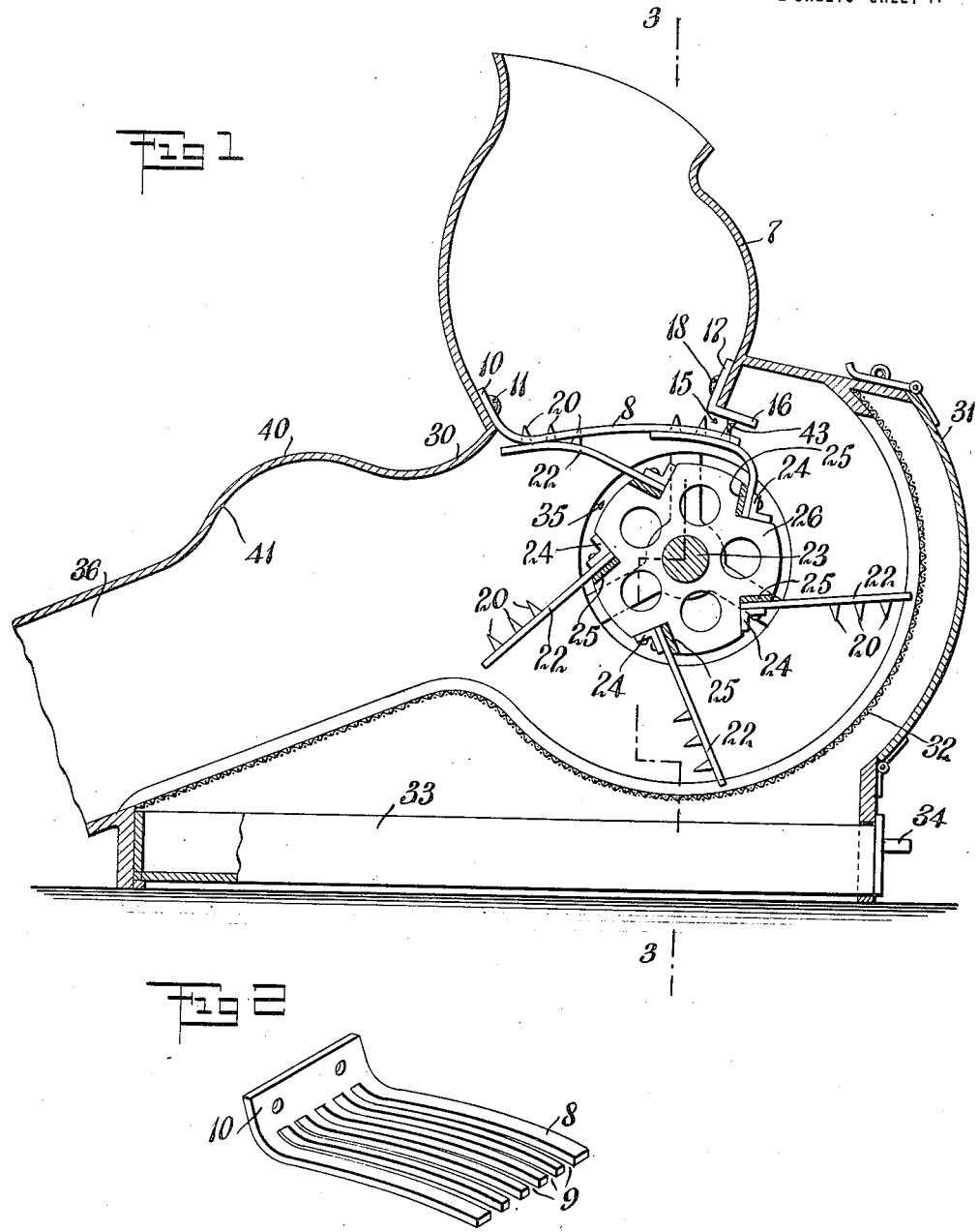

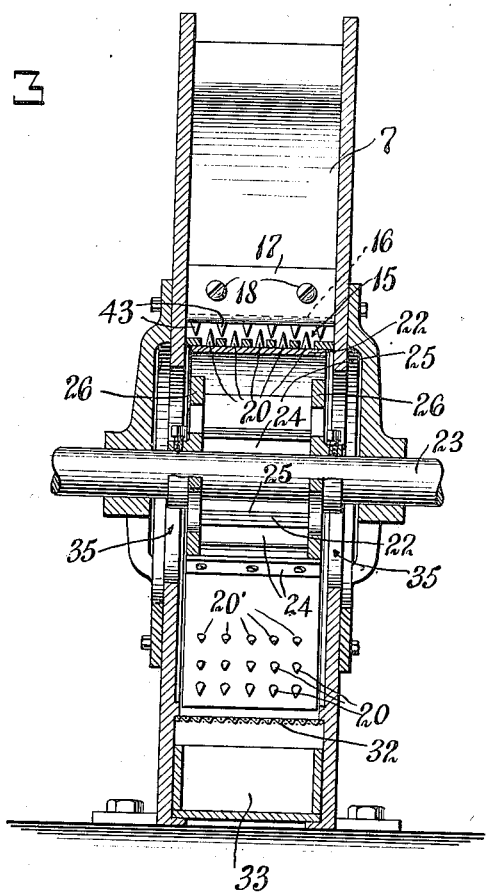

WILLIAM D. McCOY, OF BROOKLYN, NEW YORK.

SEED-COTTON OPENER, CLEANER, AND FEEDER.

1,318,215.   Specification of Letters Patent.   Patented Oct. 7, 1919.

Application filed December 31, 1915. Serial No. 69,627.

*To all whom it may concern:*

Be it known that I, WILLIAM D. McCoy, a citizen of the United States of America, residing at Brooklyn, New York, have invented a new and useful Seed-Cotton Opener, Cleaner, and Feeder, of which the following is a specification.

My invention relates to improvements in the opening and cleaning of fibrous substances and being particularly applicable to the treatment of seed cotton, is disclosed in that connection herein.

As known to those skilled in the art a cotton boll is made up of several separate locks and each lock contains a number of seeds with the fibers of the several seeds closely interlaced. The opening up of the lock and the separation of the seeds is essential to the freeing of the seed cotton from sand, leaves, dust and the accumulation of trash which is usually present in seed cotton. The thoroughness of this separation, in advance of the ginning operation, has very important bearing on the grade of the lint sample produced.

It is the purpose of my present invention to provide simple and inexpensive apparatus for thoroughly, rapidly and economically carrying on the above work.

Another object is to provide such a machine, which, in addition to the opening and cleaning functions will serve also to convey the opened and cleaned material to a gin or bin or other receptacle.

These objects I have accomplished by the employment of rotating, flexible, tangential blades carrying parallel rows of short spikes which, in the rotation of the blades, project up between the bars of a grid forming the bottom of a hopper in which the seed cotton or other material is placed. These grid bars are supported at one end so as to leave a relatively narrow exit slot at the opposite end and the grid is curved so as to intercept and deflect the tangential blades. The revolving blades are surrounded or partially surrounded by a screen which serves to confine the cotton while permitting the escape of the dust and dirt. The opened and cleaned material is conducted off by casing in the machine so as to cause the rotating blades to act as a fan, creating a sufficient current of air to convey the product through a suitable conduit to the gin or other receptacle.

Various other features and details of construction will appear as the specification proceeds, attention being directed to the accompanying drawings forming a part of this specification and which illustrate the invention embodied in a practical form.

In the drawings—

Figure 1, is a vertical sectional view of a cleaning and opening machine embodying the invention.

Fig. 2, is a detached perspective view of the grid bottom of the hopper.

Fig. 3, is a vertical sectional view taken on a plane at right angles to that of Fig. 1 and substantially on the plane of the line 3—3 of Fig. 1.

Referring to the drawings more in detail:

The numeral 7 designates a suitable hopper into which the cotton or other material is fed. This hopper has a grid bottom made up in the illustration of a plurality of upwardly curved bars 8 in parallel relation with the parallel slots 9 between them. This grid may, as indicated in Fig. 2 be conveniently formed from a single sheet of metal having one end thereof turned up as indicated at 10 to provide a supporting flange and slotted longitudinally from said supporting flange to the opposite end of the plate to provide the parallel spaced grid bars. The grid is supported in the illustration by screws 11 passed through the supporting flange 10 into the rear wall of the hopper.

The forward ends of the grid bars are spaced below the lower end of the front wall of the hopper a slight distance so as to leave a relatively narrow exit slot or throat 15. The forward end portions of the grid bars thus form the lower sides to this exit throat and an upper side to this exit throat is provided in the machine illustrated by a wall 16 in the form of a forwardly bent flange on the plate 17 which is secured to the lower end of the forward wall of the hopper by fastenings 18.

This exit throat is in the form of a relatively narrow slot, it being, in the machine illustrated, of less width than a lock but wide enough to pass a single seed. The opening and separation is effected by drawing the seed cotton or other material through this relatively narrow exit slot.

Seed cotton or other material is passed through the exit throat by teeth or pickers 20 working up through the slots in the grid and having a motion toward the exit throat.

According to the at present preferred form of machine, these pickers are carried by rotating flexible blades 22 of leather or the like material which are intercepted and deflected by the curved under surface of the grid. In the illustration these blades are mounted on a rotating shaft 23 and are secured in place thereon by clamp plates 24 which are bolted to the bars 25 secured between the heads 26 fast on the shaft. This mounting permits of the ready removal of the flexible blades for the purposes of repair or the substitution of different blades or pickers and also gives free access of air.

The pickers are in the form of spikes or spurs up standing on the upper or forward face of the blades and are disposed in line with the longitudinal open ended slots 9 in the grid so as to work therein. Preferably these spurs are arranged in rows as indicated at 20' in Fig. 3 so that for each blade there will be a plurality of teeth or spurs working in each slot in the grid.

The rotating picker member is incased in a suitable casing 30 which may be provided with a door 31 at a convenient point for the inspection and cleaning of such mechanism. Within this casing there is provided a screen 32 for screening the dirt and foreign matter from the cotton or other material, this screen conforming for a portion of its length to the circular movement of the picker blades. This curved portion of the screen is preferably just out of reach of the tips of the blades so that the blades will not scrape thereover. Below this screen a drawer 33 may be provided for catching the dirt and dust, and which when full may be removed from the casing as by means of a handle 34.

The operation of the machine is substantially as follows: The seed cotton is thrown into the hopper and falls on the gridded bottom thereof. As the picker member is rotated the blades are intercepted and deflected by the curved grid bars, the parallel rows of spikes or spurs on the several blades successively entering the parallel slots in the grid and traveling toward the exit throat. These spurs or teeth catch the locks of cotton and bear them rapidly toward the exit throat or slot and said slot being too small to permit the passage of a lock, the locks are quickly separated into the several component seeds, the seeds being borne along with the blades. As the blades pass from engagement with the ends of the grid bars and are no longer confined by said grid bars said blades swing outwardly under the influence of centrifugal force into a tangential or substantially radial position. This sudden, violent change in the angle of the blades forcibly throws the adhering seeds away from the blades and against the curved screen, which, acting as a baffle wall, separates all the adhering sand and impurities from the cotton, the impurities passing through the screen into the receptacle beyond.

In addition to the foregoing the blades create a strong current of air, air being taken in through openings 35 in the sides of the casing and this air current blows the dust from the cotton and through the screen. The air current thus produced furthermore serves to convey the cleaned and thoroughly opened seed cotton over the screen and out of the machine through a suitable conduit 36 to a cotton gin, bin or other receptacle.

A further cleaning effect is accomplished by causing the opened cotton to strike against a baffle as it leaves the pickers. This baffle is provided in the machine illustrated by forming a hump 40 in the top of the conduit by which the cotton leaves the machine, the under side of the hump providing an angular wall 41 which acts as a baffle to the cotton which is thrown from the picker blades. The impact of the cotton against this baffle wall gives the cotton a final shake which removes any sand which may have remained after the opening and screening operations. The screen, it will be noted, extends beneath said baffle so as to receive the sand extracted thereat.

I find that a more thorough and complete separation is effected by "combing" the fibers as they pass through the exit throat, a device for this purpose being illustrated in the drawings in the form of a series of teeth 43 dependent from the upper wall 16 of the throat and registering with the bars of the grid.

It will be noted that the grid bars form with the coöperating wall 16 a throat of appreciable length, and I have found in practice that the length of this throat has considerable to do with the degree of separation of the fibers. As the material is pulled through this throat by the picker teeth, the fibers are drawn out and separated. By lengthening the throat the separation is made more complete as the fibers are acted upon by the pickers to a greater extent, and the throat should be made at least long enough to prevent the fibers from curling up or bunching at the exit end of the throat.

I claim:—

1. In a machine of the character set forth, the combination of a hopper, a grid bottom to said hopper, a member located adjacent one end of said grid and providing at one end a narrow elongated exit throat and pickers working in the openings in said grid and traveling toward said narrow exit throat to thereby open and carry the material through and along and out of said exit throat.

2. In a machine of the character set forth, the combination of a hopper, a grid forming one wall of said hopper having parallel slots therein open at one end, a member extending substantially parallel to said grid and forming a narrow exit throat at the slotted end of said grid and pickers working in the slots in said grid and passing through the exit throat and out the open end of the slots.

3. In a machine of the character set forth, the combination with a grid having slots opening through one end thereof, of picker means traversing said open ended slots and means forming a relatively narrow elongated throat at the open ends of the slots in the grid to thereby enable a separation of the material in its passage through said throat.

4. In a machine of the character set forth, the combination of a hopper, upwardly curved bars forming a grid bottom to said hopper and spaced apart to provide slots therebetween, flexible blades rotatably supported below said grid arranged to be intercepted by and deflected by engagement with the under side of said curved grid and picker teeth carried by said flexible blade and working in the parallel slots in the grid.

5. In a machine of the character set forth, the combination of a hopper, an upwardly curved grid forming a bottom to said hopper and having parallel slots therein, said grid forming in conjunction with a wall of said hopper a relatively narrow exit throat leading from the hopper, rotatably supported flexible blades mounted below said grid and arranged in their rotation to engage and be deflected by said curved grid, picker teeth carried by said flexible blades working in the slots in the grid and screening for separating the foreign matter from the material passed through the exit throat by said picker teeth.

6. In a machine of the character set forth, the combination of a hopper, an upwardly curved grid forming a bottom to said hopper and having parallel slots therein, said grid forming in conjunction with a wall of said hopper a relatively narrow exit throat leading from the hopper, rotatably supported flexible blades mounted below said grid and arranged in their rotation to engage and be deflected by said curved grid, picker teeth carried by said flexible blades working in the slots in the grid and a screen extending from the exit throat side of the hopper and partially surrounding the picker blades, said screen being curved to conform for a portion of its length to the circular path traversed by the picker blades.

7. In a machine of the character set forth, the combination of a hopper, air current producing blades rotatably mounted below said hopper and arranged to directly engage and operate upon seed cotton resting in said hopper, means carried by said blades and hopper for opening seed cotton in said hopper and a screen below said blades.

8. In a machine of the character set forth, a hopper, a grid forming one wall of said hopper having slots therein open at one end, rotatably supported flexible blades forming a fan and arranged to engage and be deflected by said grid, a fan casing around said blades, a screen in said casing and picker teeth carried by said blades and working in the slots in the grid.

9. In a machine of the character set forth, the combination of a hopper, a grid forming one wall of said hopper and coöperating with a wall of said hopper to provide a narrow exit slot, said grid having parallel slots therein open at the exit slot end of the grid, picker teeth traveling in said grid slots and a fan carrying said picker teeth for carrying off the product passed through the exit slots.

10. In a machine of the character set forth, a hopper, a grid forming one wall of said hopper and coöperating at one end with a wall of the hopper to provide a relatively narrow exit slot, said grid having parallel slots therein extending to the exit end of said grid, spurs projecting into said exit slot and picker teeth working in the slots in the grid through said exit slot.

11. In a machine of the character set forth, the combination of a hopper, a grid bottom to said hopper forming in conjunction with a wall of said hopper a narrow exit throat, said grid having parallel slots therein open at the exit end of the grid, rotatably supported flexible blades mounted below said grid bottom, picker teeth carried by said blades and working in the slots in the grid toward the exit throat to thereby carry material in the hopper through said exit throat, a casing inclosing said rotating blades and a buffer disposed in the path of the material forwarded by said blades.

12. In a machine of the character set forth, the combination of a grid having open slots at one end thereof and supported at the opposite end, a revoluble member supported at one side of said grid, flexible blades carried by said revoluble member, picker teeth carried by said blades and arranged to calender with the slots in said grid when said revoluble member is operated.

13. In a machine of the character set forth, the combination with a grid supported at one end and having slots therein extending away from said supported end and opening through the opposite end of said grid, thereby providing at said unsupported end a plurality of entirely separated grid bars, and means for drawing fiber off the unsupported ends of said separated grid bars, comprising fan blades and picker teeth carried by said fan blades.

14. In a machine of the character set forth, the combination with a grid supported at one end and provided with open ended slots extending away from said supported end to the unsupported end thereof, a wall disposed to one side of the unsupported end of said grid substantially parallel to the grid and forming in connection therewith a restricted exit throat of appreciable length, pickers at the opposite side of said grid and working through the slots therein, and means for imparting movement to said pickers toward the unsupported end of said grid whereby said pickers are caused to traverse the exit throat aforesaid.

15. In a machine of the character set forth, the combination with a grid supported at one end and provided with open ended slots extending away from said supported end to the unsupported end thereof, a wall disposed to one side of the unsupported end of said grid substantially parallel to the grid and forming in connection therewith a restricted exit throat of appreciable length, teeth carried by said wall and projecting toward the unsupported end of said grid to form a comb, pickers at the opposite side of said grid and working through the slots therein and means for imparting movement to said pickers toward the unsupported end of said grid whereby said pickers are caused to traverse the exit throat aforesaid.

16. In a machine of the character set forth, a grid having slots therein opening through one end of the grid, rotatably supported flexible blades arranged to engage and be deflected by said grid, a casing around said blades and picker teeth carried by the blades and working in the slots in the grid and out through the open ends of said slots.

17. In a machine of the character set forth, the combination of a grid having parallel slots therein opening through one end of the grid, a member disposed opposite and substantially parallel to the slotted end portion of said grid and forming in conjunction therewith a relatively narrow exit throat and pickers working in the slots in said grid and traveling toward said exit throat and out through the open ended slots in the end of the grid.

18. In a machine of the character described, a rotating member having flexible picker means rotatable therewith, deflecting means for said flexible picker means, means for supplying the material to be acted upon by the picker means, a baffling wall arranged adjacent to the path of travel of the picker means, and means for rotating the flexible picker means past the deflecting means whereby the material acted upon is carried along by the picker means and thrown against said baffling wall when the picker means is released from said deflecting means.

19. In a machine of the character described, a rotating member having flexible picker means rotatable therewith, deflecting means for said flexible picker means, means for supplying the material to be acted upon by the picker means, a screen arranged adjacent to the path of travel of the picker means, and means for rotating the flexible picker means past the deflecting means whereby the material acted upon is carried along by the picker means and thrown against said screen when the picker means is released from said deflecting means.

20. In a machine of the character described, a rotating member having flexible picker means rotatable therewith, a grid coöperating with said picker means and having one portion of the grid arranged nearer to the axis of said rotating member than another portion of the grid, and means for supplying material to be acted upon by said picker means in conjunction with said grid, whereby the picker means coacts with the second mentioned portion of said grid before it coöperates with the first mentioned portion of said grid and thus draws the material along said grid and at the same time flexes said picker means preparatory to discharge of the material from said grid.

21. In a machine of the character set forth, the combination of a rotating member and flexible picker means carried thereby, means for deflecting said flexible picker means during a portion of their rotary movement, means for supplying material into the path of the deflected picker means and a baffle wall disposed in front of the deflecting means whereby the flexible picker means upon their release from the deflecting means will throw the material engaged thereby into engagement with the baffle wall aforesaid.

22. In a machine of the character described, the combination with a grid having slots therein and adapted to support a body of seed cotton, of a single opening and separating device rotatably mounted at one side of said grid and provided with flexible blades engaging the grid and carrying picker teeth working in the slots in the grid.

W. D. McCOY.